No. 607,199. Patented July 12, 1898.
L. P. TOUCHET.
EXPANSIBLE HORSESHOE.
(Application filed Mar. 5, 1898.)
(No Model.)
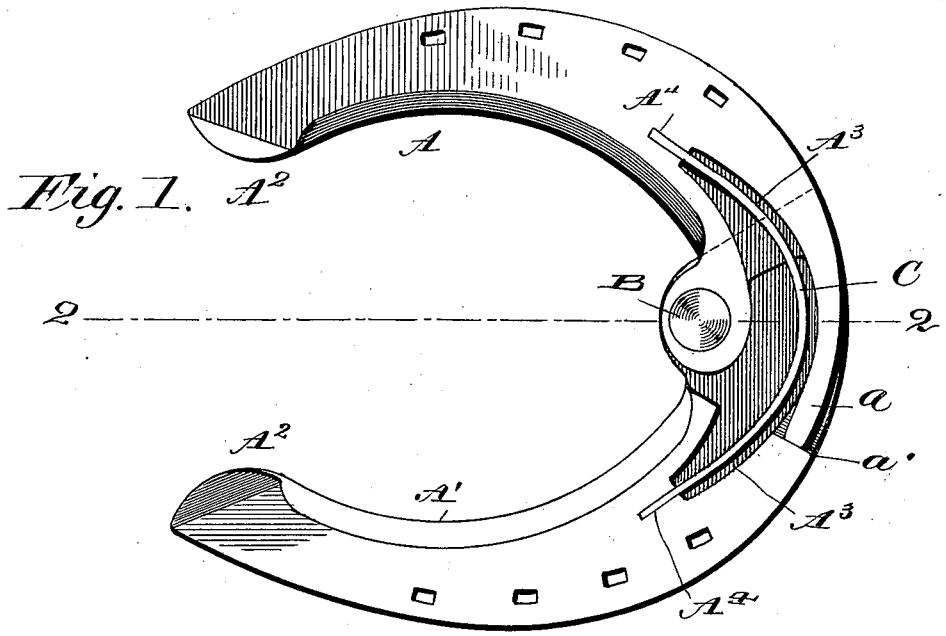
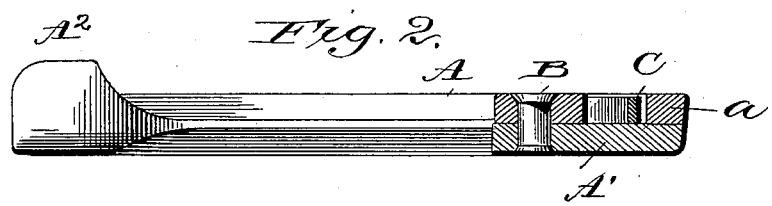
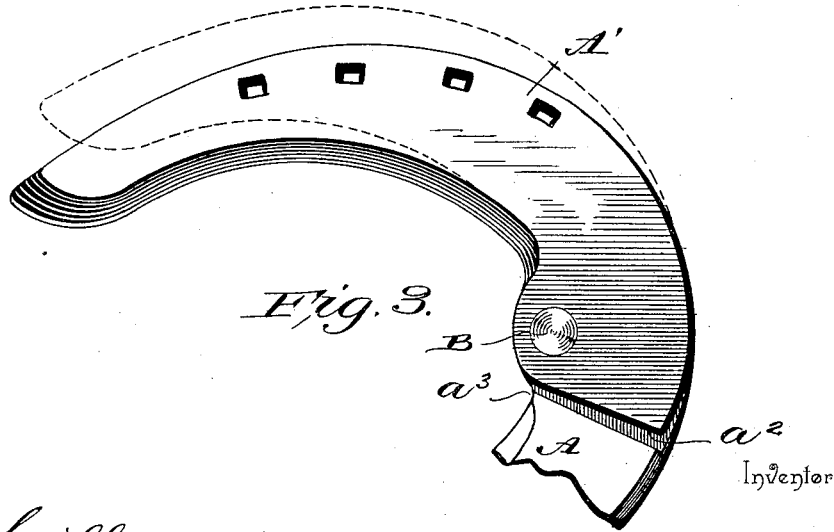
Witnesses
L. C. Hills.
Alfred T. Gage.
Inventor
Louis P. Touchet,
By E. B. Stocking
Atty.

United States Patent Office.

LOUIS P. TOUCHET, OF WATERTOWN, NEW YORK.

EXPANSIBLE HORSESHOE.

SPECIFICATION forming part of Letters Patent No. 607,199, dated July 12, 1898.

Application filed March 5, 1898. Serial No. 672,771. (No model.)

*To all whom it may concern:*

Be it known that I, LOUIS P. TOUCHET, a citizen of the United States, residing at Watertown, in the county of Jefferson, State of New York, have invented certain new and useful Improvements in Expansible Horseshoes, of which the following is a specification, reference being had therein to the accompanying drawings.

This invention relates to expansible horseshoes, and has for its object to produce a shoe, simple in construction, by which the desired expansive pressure may be secured upon the hoof of a horse and the spring used held against rattling or contacting with the ground, while the leverage secured produces the maximum expansive power of which the spring is capable.

Other and further objects and advantages of the invention will appear in the following description and the novel features thereof will be particularly pointed out in the appended claims.

In the drawings, Figure 1 is a top plan view of the invention. Fig. 2 is a section on the line 2 2 of Fig. 1, and Fig. 3 is a detail bottom plan view of one portion of the shoe.

Like letters of reference indicate like parts throughout the several figures of the invention.

The shoe is composed of separate members A and A', pivotally connected together by a bolt B at the inner edge of the toe portion of the shoe and opposite the point of the frog of a hoof. The separate members A and A' are each provided with an upwardly-extending clip $A^2$, which engages the rear of the hoof of the horse, so as to exert an expansive pressure at that point and beyond the point where the last nail enters the horse's hoof through the shoe. In a contracted hoof the contraction begins about where the last nail passes through the shoe and extends toward the heel, and the advantage will thus be seen of transmitting the pressure to the heel of the hoof by means of the clips $A^2$. The toe portion of each section is provided with a recess $A^3$ and with a socket $A^4$. The opposite ends of a flat spring C are seated within the sockets $A^4$, and the body portion of said spring lies within the recess formed in the upper surface of the shoe and forward of the pivotal point. This location of the pivotal point within the circumference of the spring produces an increased and improved leverage, which assists in the contraction of the shoe and applies the expansive power of the spring to a better advantage than when otherwise located.

The member A is provided with an extending arm $a$, which abuts against a stop $a'$, formed upon the member A', while the member A' is provided with an angular face $a^2$, adapted to abut against a shoulder $a^3$ upon the under surface of the member A. These portions limit the outward expansion or move of the members of the shoe to that necessary for the proper expansion of the hoof.

It will be observed that the location of the recess containing the spring upon the upper surface of the shoe protects the spring against contact with the ground and from becoming clogged with dirt or stones, while the spring is readily seated within the sockets and may be removed or replaced whenever necessary or desirable. The location of the pivotal point within the circumference of the spring exerts a greater leverage upon the spring and permits the spring to exert a greater leverage upon the shoe in its expansion, while the pivotal bolt is protected from injury by striking the toe of a shoe against an obstruction, which is very liable to occur.

From the foregoing description the application and operation of the shoe will be readily understood, and the same may be applied by pressing the parts into position (shown by full lines in Fig. 3) with the clips $A^2$ at the heel of the hoof. The gradual expansive action of the shoe will cause the parts to finally assume the position indicated in dotted lines upon Fig. 3, and when in this position the expansion of the hoof will be accomplished.

Having described my invention, what I believe to be new, and desire to secure by Letters Patent, is—

1. An expansible horseshoe composed of separable members pivotally connected together and provided with spring-containing recesses and spring-holding sockets adjacent to the pivot, and a spring held in said sockets and extending circumferentially of said pivot; substantially as specified.

2. An expansible horseshoe composed of separable members pivoted together at the inner face of the toe portion and provided with spring-retaining sockets, a flat spring seated at its opposite ends in said sockets, upwardly-extending clips provided at the inner ends of said members, and a contacting shoulder to limit the expansion of said members; substantially as specified.

3. An expansible horseshoe composed of recessed members pivoted together at the center of their inner edge opposite to the point of the frog of the hoof, a semicircular flat spring held at its opposite ends in sockets formed in the opposite members of the shoe adjacent to the pivot, and stops to limit the expansion of said shoe; substantially as specified.

In testimony whereof I affix my signature in presence of two witnesses.

LOUIS P. TOUCHET.

Witnesses:
BRAYTON G. CLARK,
G. L. BAXTER.